United States Patent [19]
Molyneux

[11] Patent Number: 5,388,929
[45] Date of Patent: * Feb. 14, 1995

[54] METHOD OF RENOVATING AND/OR PROTECTING SEWERS OR PIPES

[75] Inventor: Sydney Molyneux, Macgregor, Australia

[73] Assignee: Danby of North America, Cary, N.C.

[ * ] Notice: The portion of the term of this patent subsequent to Sep. 8, 2009 has been disclaimed.

[21] Appl. No.: 899,046

[22] Filed: Jun. 16, 1992

Related U.S. Application Data

[63] Continuation of Ser. No. 660,953, Feb. 26, 1991, Pat. No. 5,145,281.

[30] Foreign Application Priority Data

Mar. 29, 1990 [AU] Australia ................................ PJ9374
Jun. 4, 1990 [AU] Australia ............................... PK0425
Jul. 19, 1990 [EP] European Pat. Off. ............ 90307906

[51] Int. Cl.⁶ .................................................. F16L 1/00
[52] U.S. Cl. ..................................... 405/154; 405/146; 405/151
[58] Field of Search ...................... 405/154, 150.1, 151, 405/146; 138/97; 156/287, 294

[56] References Cited

U.S. PATENT DOCUMENTS

| | | | |
|---|---|---|---|
| 739,969 | 9/1903 | Young | 405/151 |
| 770,894 | 9/1904 | Dutton | 405/152 |
| 1,378,158 | 5/1921 | West et al. | 405/151 |
| 3,438,211 | 4/1969 | Zywietz et al. | 405/152 |
| 3,815,370 | 6/1974 | Lennox | 405/152 |
| 3,969,906 | 7/1976 | McBean | 405/146 |
| 4,678,370 | 7/1987 | Allen | 405/154 |

*Primary Examiner*—Dennis L. Taylor
*Attorney, Agent, or Firm*—Fisher & Associates

[57] ABSTRACT

A method of renovating sewers or pipes where an elongate plastic strip (30) is spirally wound in the sewer or pipe, the strip having joint formations (32) along each side so that a joint formation (33) on one side of the strip will butt against the joint formation (34) along the other side of an adjacent strip and a joining strip (50) is spirally wound into engagement with the adjacent joint formations to lock the windings of the strip into place. Grout is injected into the spaces between the liner and the wall of the sewer or pipe to secure the liner in position.

2 Claims, 8 Drawing Sheets

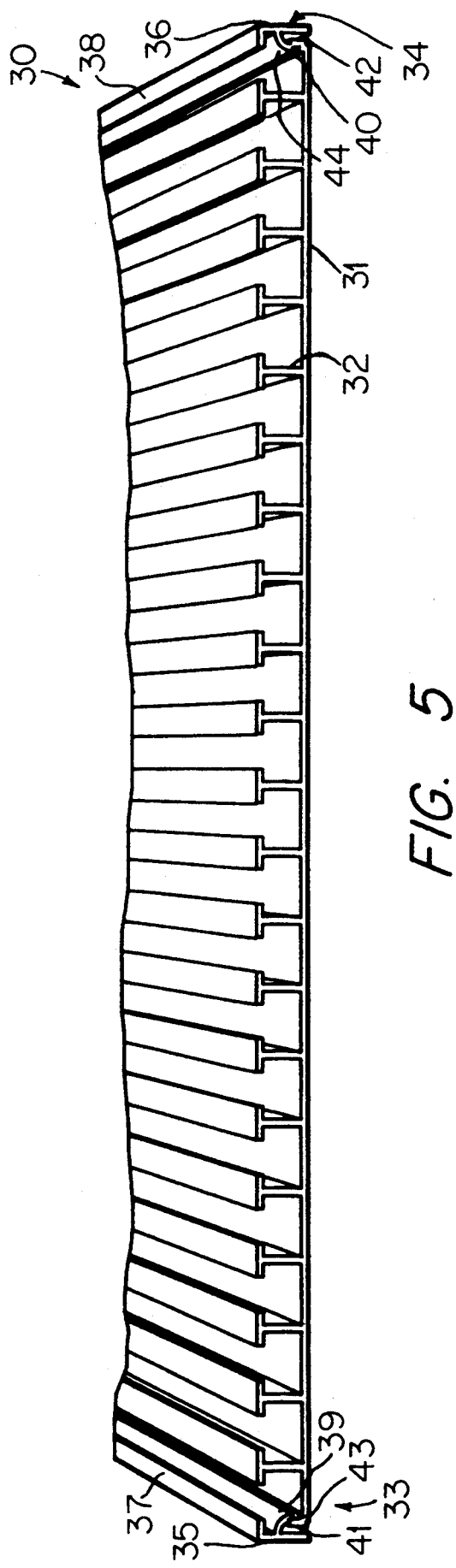
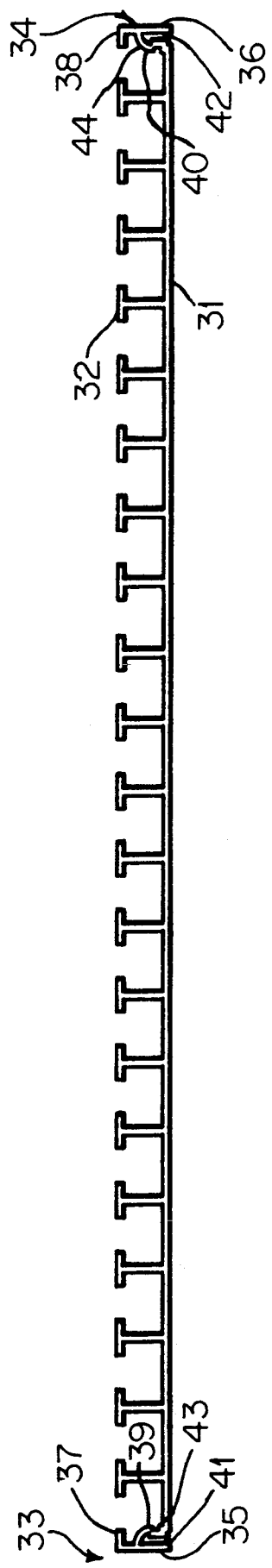
FIG. 5
FIG. 6

METHOD OF RENOVATING AND/OR PROTECTING SEWERS OR PIPES

This is a continuation of copending application(s) Ser. No. 660,953 filed Feb. 26, 1991 and now U.S. Pat. No. 5,145,281; Sep. 8, 1992.

BACKGROUND OF THE INVENTION

1. Field of the Invention

This invention relates to a method of renovating and/or protecting sewers and pipes. The invention is particularly suitable for, but not limited to, man-entry, circular and oviform sewers.

2. Prior Art

International Publication No. WO88/05884 (International Application No. PCT/AU88/00027) (Danby Pty Ltd) described a method for renovating and/or protecting sewers or pipes. A liner was formed from lengths of PVC panels cut to length and placed around the wall of the pipe, butt-jointed by joining strips. Each panel had a formation along one side complementary with a formation along the other side so that adjacent panels could be clipped together to form a liner extending from manhole to manhole along the sewer or pipe.

While this method was an improvement over existing methods, it had a number of practical limitations. Each panel had to be individually cut to length, positioned, engaged with the adjacent panel(s) and butt-jointed. As each panel was, eg. 200 mm wide, this was laborious. In addition, it was found that as further panels were positioned, their effective diameter would reduce and so the ends could not be easily butted together and the panels had to be hammered slowly around the wall to the desired diameter. It is believed that this "creep" or reduction in diameter resulted from the engagement of the side of a panel in the formation of the preceding panel. If the panels were cut progressively shorter to overcome the "creep" the ends could be butted together but the diameter of the resultant liner was reduced along its length.

SUMMARY OF THE PRESENT INVENTION

It is an object of the present invention to provide a method which is quicker and simpler than the prior art method just described.

It is a preferred object to provide a method which can more easily compensate for diameter variations in the sewer or pipe being repaired or lined.

Other preferred objects will become apparent from the following description.

In a broad aspect, the present invention resides in a method of lining sewers or pipes including:

spirally winding an elongate strip in the sewer or pipe, the strip having respective joint formations along each side arranged so that the joint formation on one side of the strip will butt against the joint formation along the other side of an adjacent winding of the strip; and spirally winding an elongate joining strip into engagement with the adjacent joint formations of the adjacent windings of the strip to lock the windings of the strip together.

The liner may be assembled in sections from respective lengths of strip joined together by a suitable joining strip or piece.

If required, grout may be injected or otherwise inserted into the space between the liner and the wall of the sewer or pipe to secure the liner in position.

Preferably, the strip which may be extruded from a PVC, has a substantially planar body with a plurality of outwardly directed formations, eg. of Y- or T-section on the outer face of the body. These formations space the body from the wall, and may key the liner to the grout.

Preferably, the joint formations along the strip are mirror images.

Preferably, each joint formation has a leg substantially perpendicular to the body, directed outwardly or inwardly and arranged to abut the leg of the other joint formation as an adjacent winding of the strip. Preferably, an inwardly directed channel is provided inwardly of, but adjacent to, the leg in each joint formation.

Preferably, the joining strip has a pair of substantially parallel, spaced legs interconnected by a body, where the distal portions of the legs have oppositely directed flanges or ribs which engage respective abutment faces in the channels in the joint formations.

For improved sealing of the joining strip to the strip, resilient plastic zones (of lower hardness) may be co-extruded on the legs of the joining strip, the zones being compressed by the strip to form a sealing engagement therebetween.

To accommodate variation in the diameter of the sewers or pipes, or local variations in the walls thereof (or the alignment thereof, one or more flexible or resilient sections may be co-extruded into the body of the strip and/or the body of the joining strip to be compressed/expanded.

For smaller diameter curves in the alignment of the sewers or pipes, a modified joining strip (which may also incorporate the flexible co-extrusion) may be used in joining the strip.

BRIEF DESCRIPTION OF THE DRAWINGS

To enable the invention to be fully understood, a preferred embodiment will now be described with reference to the prior art, in which:

FIGS. 5 and 6 are respective perspective and sectional end views of the liner strip;

DETAILED DESCRIPTION OF THE PREFERRED EMBODIMENTS

Figure 1:
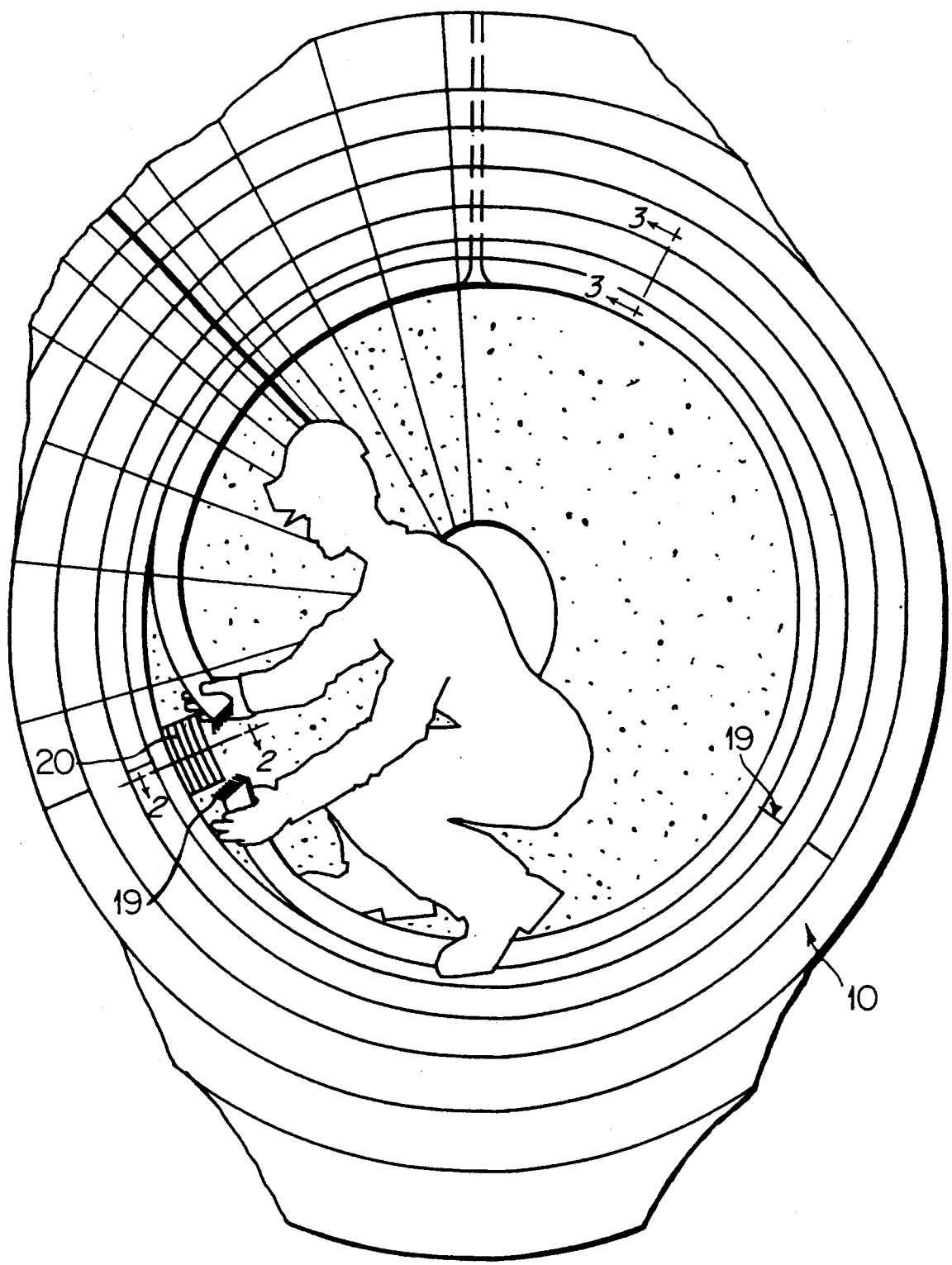
FIG. 1 is a perspective view of the prior art liner being installed in a pipe.
Figure 2:
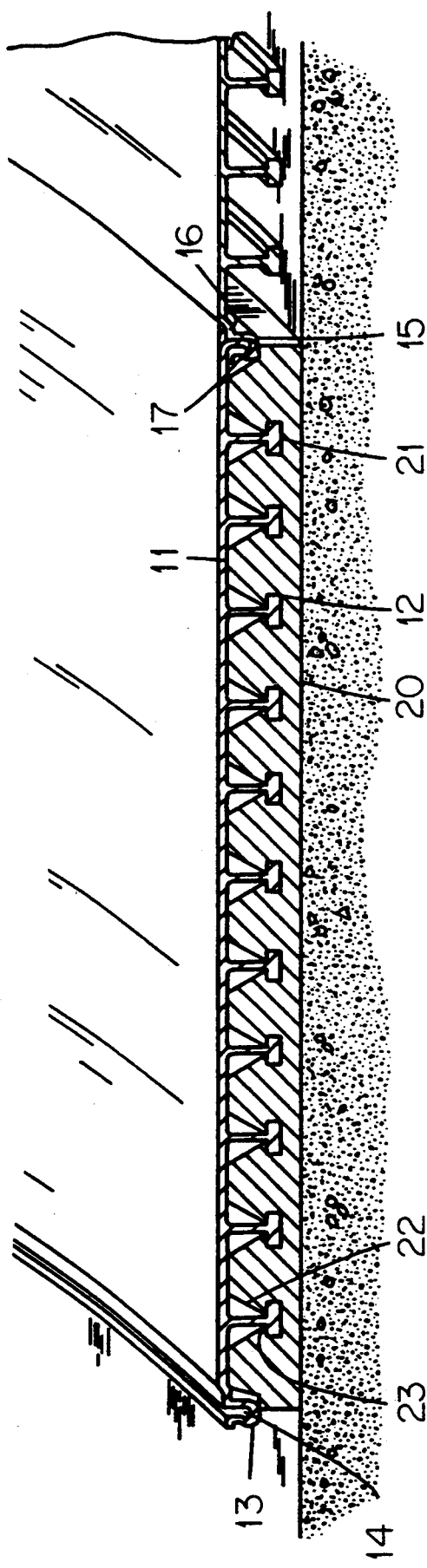
FIG. 2 is a sectional end view, taken on line 1—1 on FIG. 1, showing the joining of the prior art panels.
Figure 3:
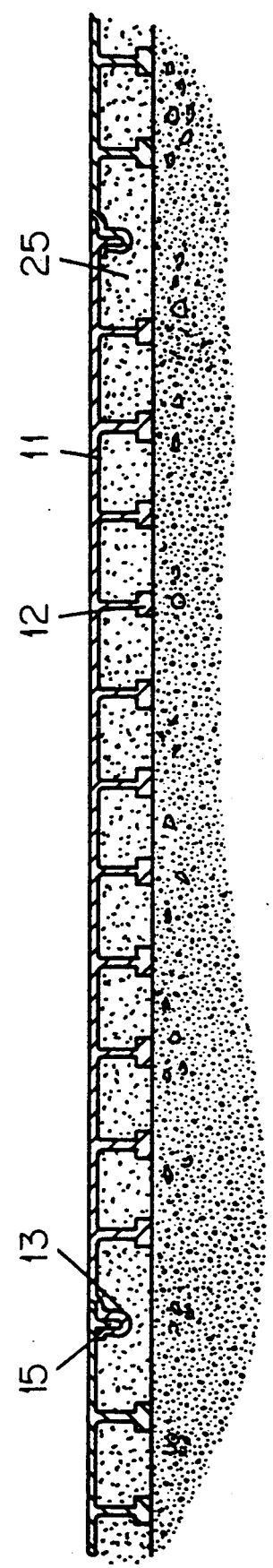
FIG. 3 is a sectional end view, taken on line 3—3 on FIG. 1, showing the prior art liner which has been grouted.

The prior art method of FIGS. 1 to 3 will now be briefly described.

Each panel 10 is extruded of unplasticized PVC (uPVC) and has a planar body 11 with a smooth inner face. A plurality of T-shaped formations 12 are formed integrally with the panel on the outer side of the body. The formations 12 reinforce the body when the panels are curved, space the body 11 from the sewer wall and key the liner to the grout in the cavity between the sewer wall and the liner.

A first joint formation 13 (see FIG. 2) is provided along one side of each panel. The formation 13 is inwardly directed and is of substantially U-shape with longitudinal recess 14.

A second joint formation 15 is provided along the other side of each panel 10. This formation has an outwardly directed leg 16 engageable in the mouth of the first joint formation 13 and has a distal bead 17 which engages the recess 14.

As shown in FIG. 3, the adjacent sides of the panels 10 are secured together by the complementary first and second joint formations 13, 15.

In use the panels 10 are factory cut to length to suit the circumference of the sewer to be lined.

The panels 10 are passed down a manhole into the pipe and are curved around the wall of the pipe (see FIG. 1). The panels 10 are butted together, the first and second joint formations 13, 15 of the adjacent panels being clipped together to form a liner extending from manhole to manhole.

When each panel 10 is installed, its ends 19 are butted together and are joined by a female joining strip (see FIGS. 1 and 5). As shown in FIG. 1, the butt-joints of adjacent panels 10 are offset.

The female joining strip (FIG. 1) is also formed of extruded uPVC and has a plurality of longitudinal recesses 21 to receive respective areas of the formations 12. Each recess 21 has downwardly convergent upper side walls 22 and locking abutments 23.

Generally the liner, which has its formations 12 bearing against the pipe wall, does not require grouting. However, hydrogen sulphide gas in the sewer may have eaten away areas of the upper portion of the pipe wall. If this has occurred, holes may be drilled through the pipe wall and grout 25 pumped into the cavity between the liner and the pipe wall.

When the grout sets, the liner is securely locked in place in the sewer. As the liner is placed against the wall, spaced by the formations 12, 15, little cross-sectional area is lost and the smooth inner surface of the liner provides good hydraulic performance.

As hereinbefore described, the problem with the prior art method has been the engagement of the first and second joint formations 13, 15 of adjacent panels 10, to cause the effective length of the panels to be increased so that the ends cannot be butted together for joining by the female joining strip 20.

Referring now to FIGS. 5 and 6 in relation to the present invention, the liner strip 30 has a planar body 31 and T-formations 32 as hereinbefore described and is extruded from uPVC. First and second joint formations 33, 34 each has an outer leg 35, 36 (with an inturned flange 37, 38) connected to the planar body 31 by a substantially L-shaped portion 39, 40 to define a respective channel 41, 42 with an abutment face 43, 44.

Figure 7:
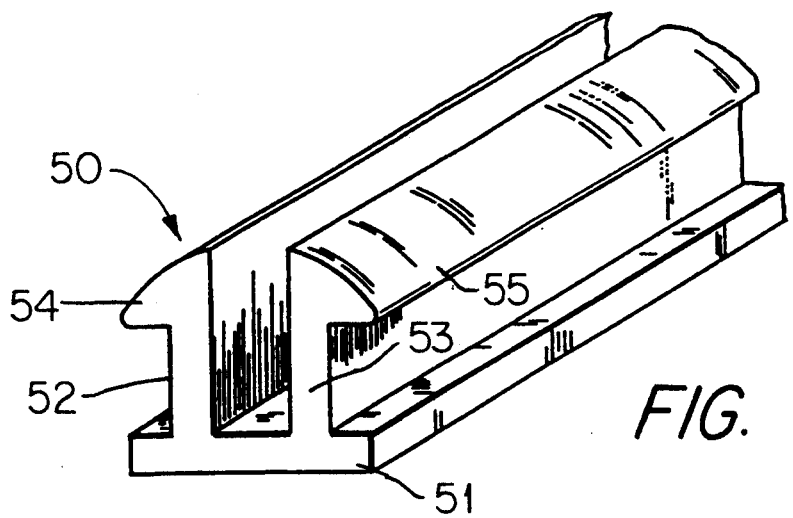
FIG. 7 is a perspective view of the joining strip.

The joining strip 50 (see FIG. 7), also extruded of uPVC, has a body 51, with spaced, parallel legs 52, 53, each provided with outwardly directed flanges or beads 54, 55.

Figure 4:
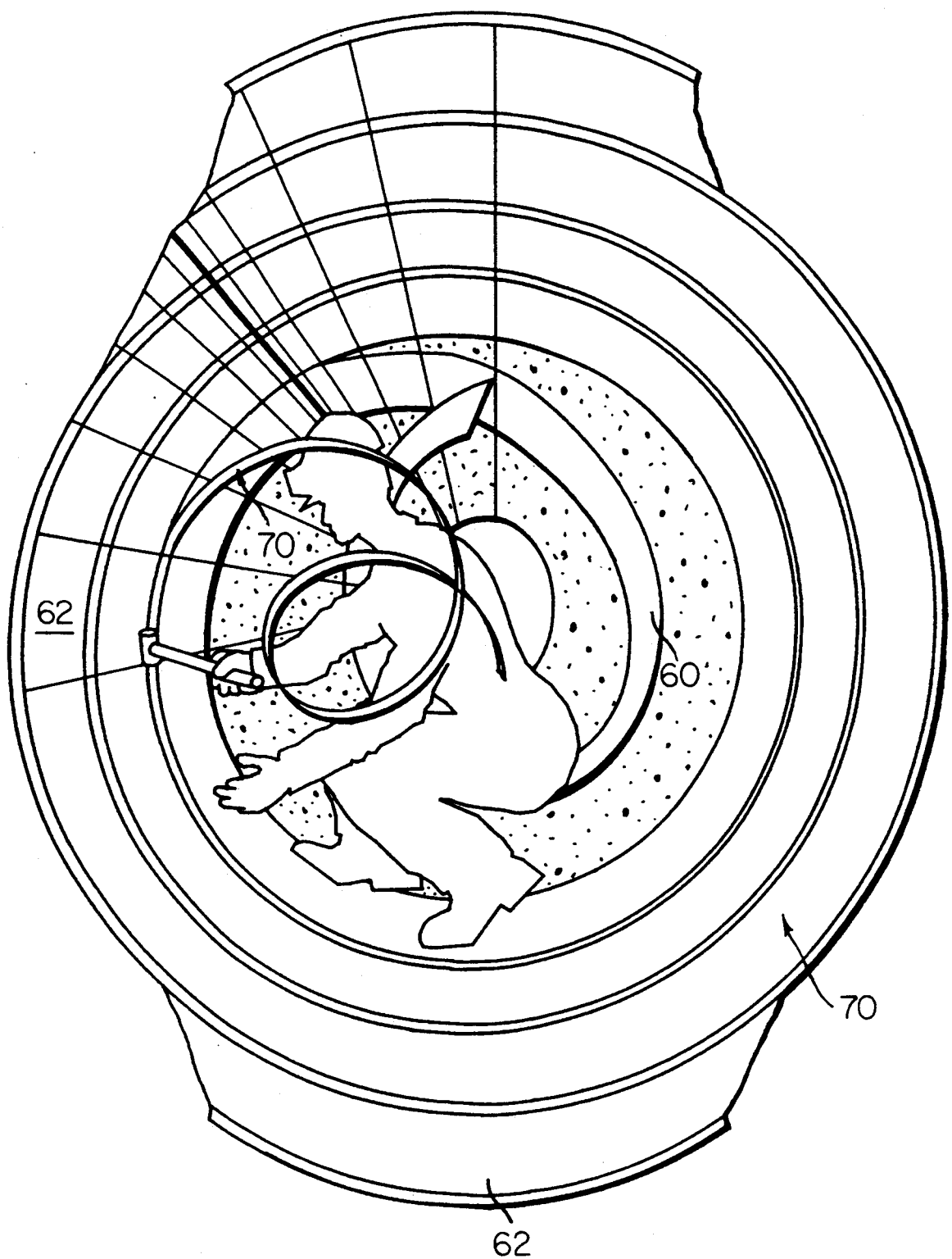
FIG. 4 is a perspective view of the liner of the present invention being installed in a pipe.

The liner strip 30 is cut to an easily workable length, eg. 50 meters and may be, eg. 300 mm wide. As shown in FIG. 4 the workman spirally winds the liner strip 30 within the pipe with the T-formations 32 abutting the pipe wall, and with the legs 35, 36 of the joint formations 33, 34 abutted in face-to-face contact. When the liner strip 30 has been fully wound within the pipe, the workman forces the joiner strip 50 into engagement with the adjacent joint formations 33, 34 at one end of the liner and progressively locks the adjacent turns of the liner strip 30 together. The joiner strip 50 is hammered into position, where the legs 52, 53 enter the channels 41, 42 of the joint formations 33, 34 and the beads 54, 55 engage the abutment faces 43, 44 to lock the joiner strips 50 in place.

A further length of the liner strip 30 is butt-jointed to the end of the liner and the installation steps are repeated. (The lengths of the liner strip may be joined using H-section connector strips or by welding the adjacent ends of the liner strip together.)

When the liner has been formed between adjacent manholes, grout may be injected into the space between the liner and the pipe wall as described in relation to the prior art.

As the adjacent turns of the liner strip are not interconnected until the liner has been formed, and the legs 35, 36 are butted together face to face, slippage between the adjacent turns, and variations in liner diameter, are easily accommodated and the joiner strip can be more quickly and easily installed than the engagement of the first and second joint formations in the prior art method.

Figure 8:
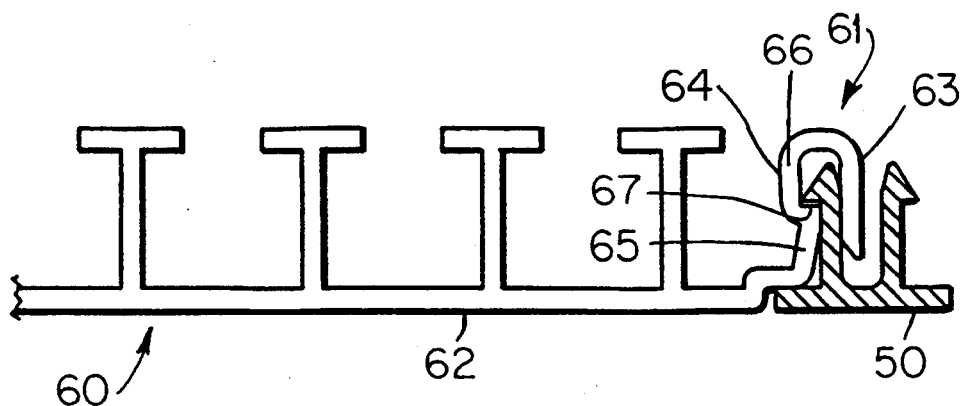
FIG. 8 is a sectional end view of an alternative strip profile.

Referring now to FIG. 8, the strip 60 is generally of the same profile as strip 30 but with a modified joint formation 61 along each side of the planar body 62. As shown, the joint formation has an outer, inwardly directed leg 63 which abuts the corresponding leg on an adjacent strip—see FIG. 9. The inner leg 64, integral with the body, has an inner portion 65 and outer portion 66 which define an abutment face 67 which engages the underside of the respective flange on head 54, 55 of the joining strip 50.

Figure 9:
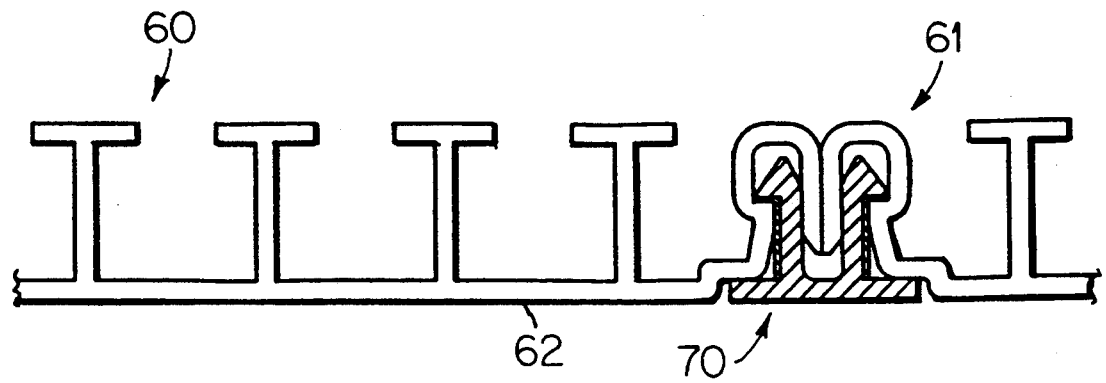
FIG. 9 is a similar view showing a modified form of the joining strip incorporating sealing zones on the legs.
Figure 9A:
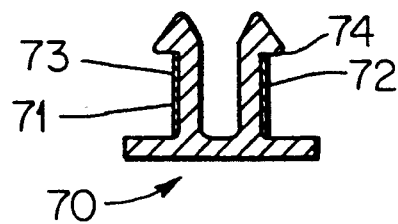
FIG. 9A is a sectional end view of the joining strip of FIG. 9.

Referring to FIGS. 9 and 9A, improved sealing between the strip 60 and joining strip 70 can be effected by the co-extrusion of softer, resilient sealing zones 71, 72 on the outer faces of the legs 73, 74. The sealing zones may be, eg. 0.5 mm thick and extruded from a plastic with a lower Durometer hardness than the body and legs and flanges of the joining strip 70.

Figure 10:
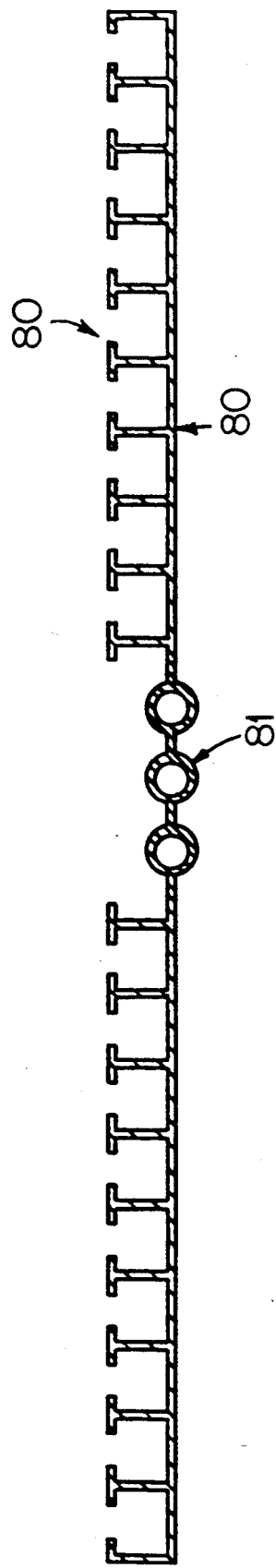
FIG. 10 is a sectional end view of a strip with a flexible co-extrusion region.
Figure 11:
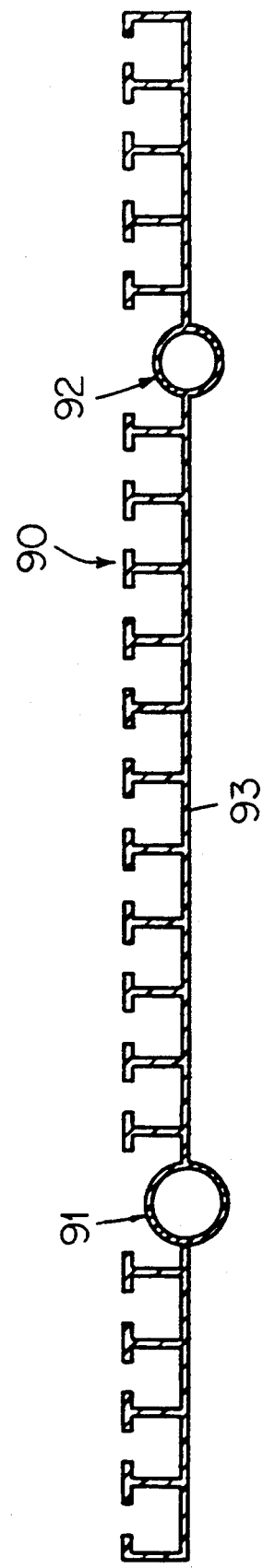
FIG. 11 is a similar view of a strip with two flexible regions.
Figure 12:
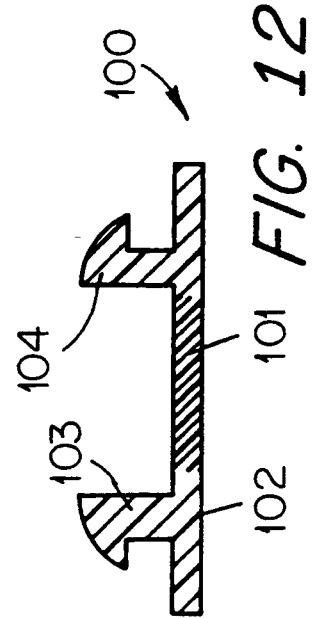
FIG. 12 is a sectional end view of a joining strip with a flexible body region.
Figure 14:
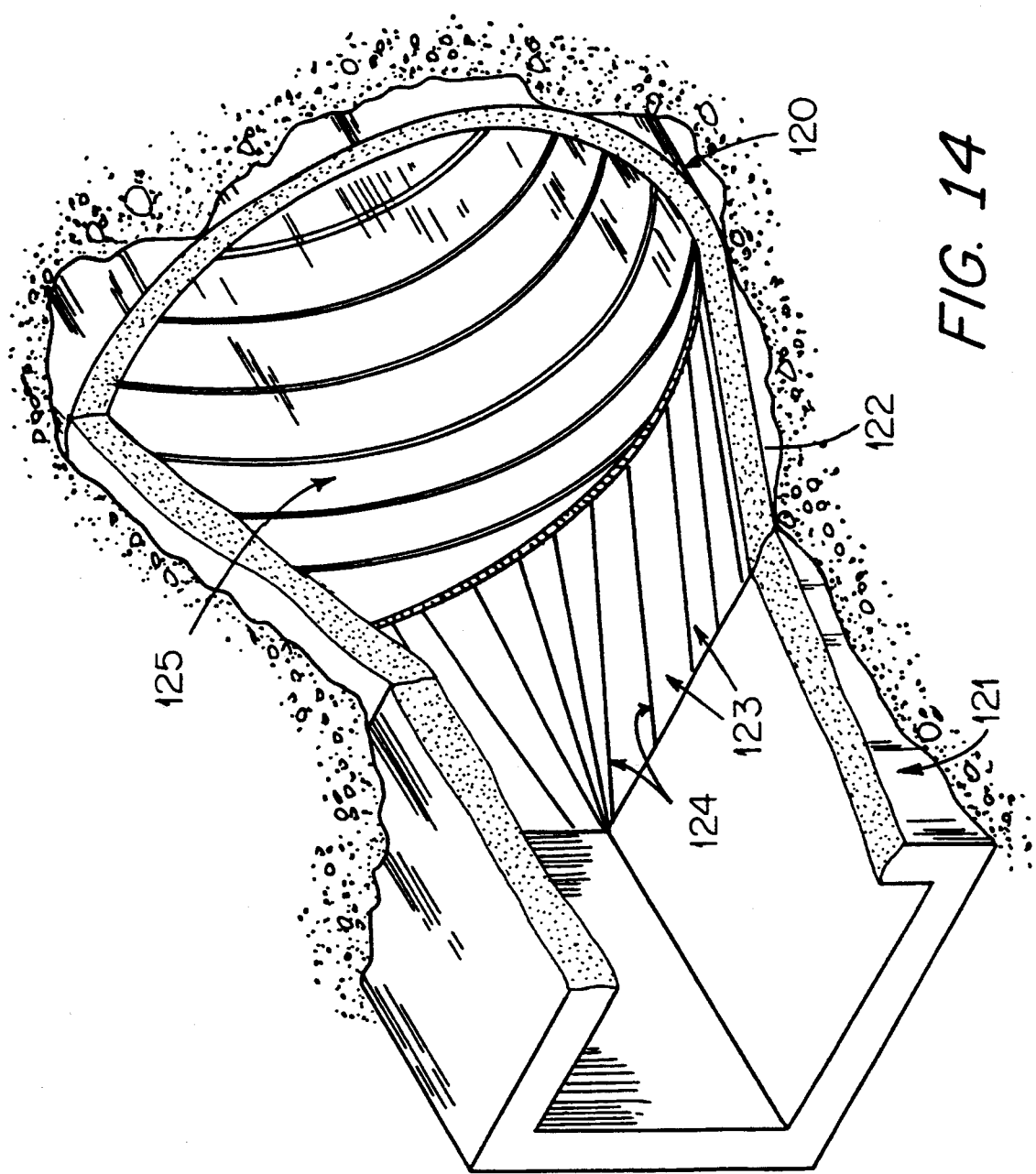
FIG. 14 is a perspective view of the connection of the liner to a box-culvert.
Figure 15:
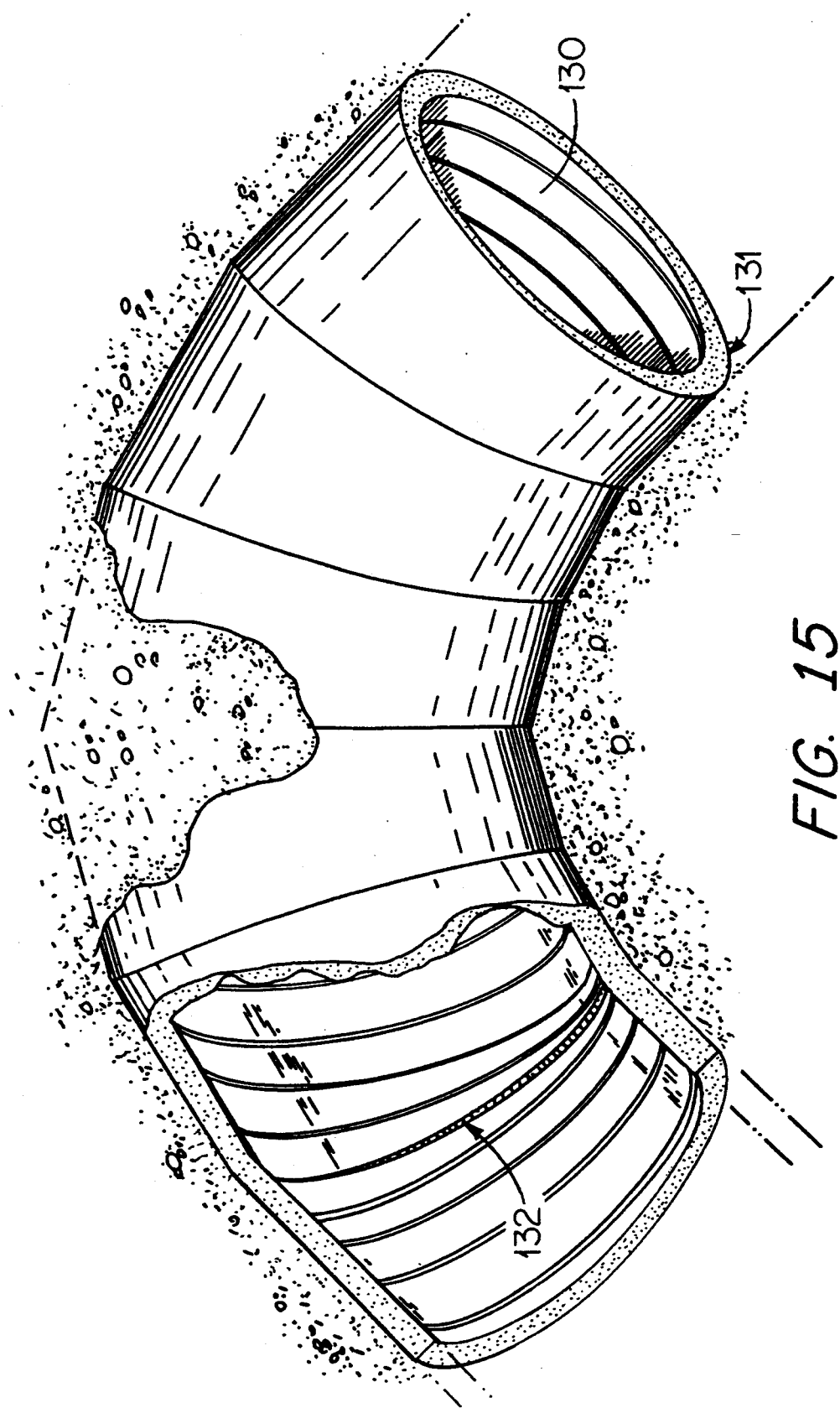
FIG. 15 is a perspective view of the liner in a curved section of the pipe.

Local variations in the sewer or pipe-walls, diameter and/or alignment can be overcome by the use of strips 80, 90 (see FIGS. 10, 11) which incorporate flexible co-extrusions 81, 91, 92 (generally of lower Durometer hardness plastic) in the body 82, 93. In addition, or as an alternative, the joining strip 100 (FIG. 12) may have a flexible co-extrusion 101 in the body 102 intermediate the legs 103, 104.

When any variation is encountered, eg. the sewer both uses and bends the flexible co-extrusions 81, 91, 92, 101 may be expanded or compressed, as required, to enable the strips 80, 90 to be wound within the sewer or pipe and locked together by the joining strips 50, 70, 100. While the strips have been shown with one or two flexible co-extrusion regions, three or more such regions may be provided in the planar body portions of the strips. In addition, the "tubular" co-extrusions can be replaced by corrugated, curved or other profiles which assist in the lateral expansion or compression thereof.

Figure 13:
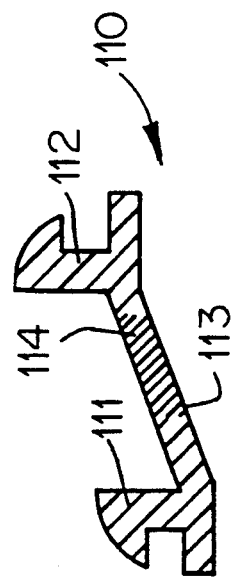
FIG. 13 is a sectional end view of a joining strip for corners.

For smaller radius bends, the joining strip 110 shown in FIG. 13 may be employed, where the legs 111, 112 are vertically offset by an inclined central body portion 113. (This central body portion may also comprise, or include, a flexible co-extrusion region, eg. at 114). With the strips 80, 90 and/or joining strip 100, local variations in the sewers or pipes can be accommodated without the need to wind a smaller diameter liner to avoid the variations. This results in an overall larger liner diameter, high liquid flow, and simpler, less-expensive installation of the liner.

To connect a sewer 120 to a box-section culvert or pipe 121, the sewer 120 is lined as hereinbefore described and the connection section 122 is lined with strips 123 of the joining strip cut as required to match the tapered connection section. The side edges 124 of the strips 123 may be welded together, eg. with a PVC strip welded with hot air. The welded joints between the strips 123, and the liner 125 in the sewer, are gas tight. A liner (not shown) may be placed in the culvert or pipe 121 and the strips 123 welded thereto to combine the PVC liner through the culvert or pipe 121.

At a hand, see FIG. 13, the strip 130 may be cut with a longitudinal taper (ie. removing one of the joint formations) would in the sewer or pipe 131 and the abutted side edges are welded with a PVC welding strip and/or infill pieces 132 are required. Once again, the welded joints between the adjacent strip sections, or strip and infill pieces are gas tight.

To prevent roots entering the lined pipes, copper sulphate may be impregnated in the grout.

The present invention results in a simpler, more efficient method of lining sewers and pipes for either restoration or protection.

The embodiments described and illustrated are by way of examples only and various changes and modifications may be made thereto without departing from the scope of the present invention defined in the appended claims.

I claim:

1. A method of lining sewers or pipes having an inside diameter large enough to accommodate a workman inside thereof comprising the steps of:
    spirally winding an elongated strip within said sewer or pipe;
    said strip having respective joint formations along each side, a smooth inner face, and a plurality of outwardly directed formations;
    maintaining the outer diameter of said winding so as to substantially conform to the inner diameter of said sewer or pipe with said outwardly directed formations facing the inner surface of said sewer or pipe;
    arranging said respective joint formations such that the joint formation on one side of said strip butts against the joint formation along the other side of an adjacent winding of said strip;
    spirally winding an elongated joining strip within said sewer or pipe in a position where said joint formation on one side of said strip butts against said joint formation along said other side of said adjacent winding of said strip; and
    forcing said respective adjacent joint formations of said elongated strip and said elongated joining strip into engagement so as to lock said windings of said strip together;
    each of said steps being performed by said workman while inside of said sewer or pipe.

2. A method according to claim 1 further comprising the step of injecting grout into the space between the liner and the wall of the sewer or pipe.

* * * * *